O. Chanute.
Rolling Track Irons.
Nº 61,397.        Patented Jan. 22, 1867.
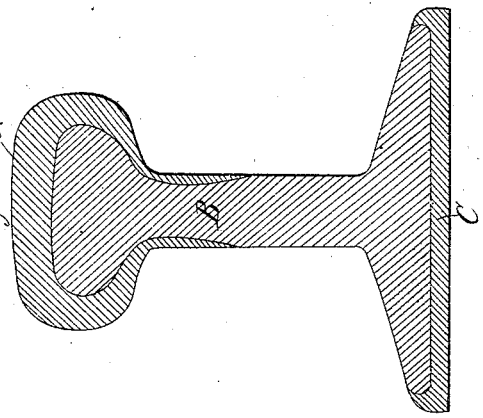
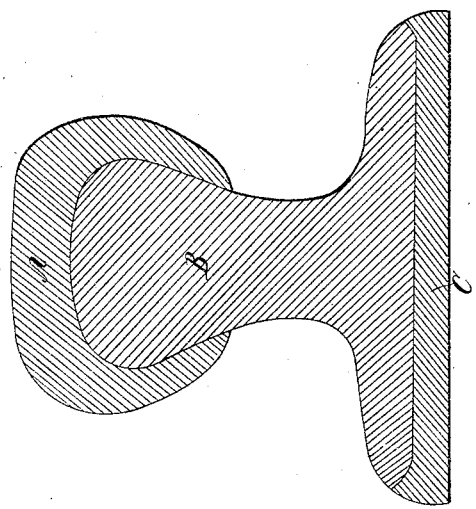
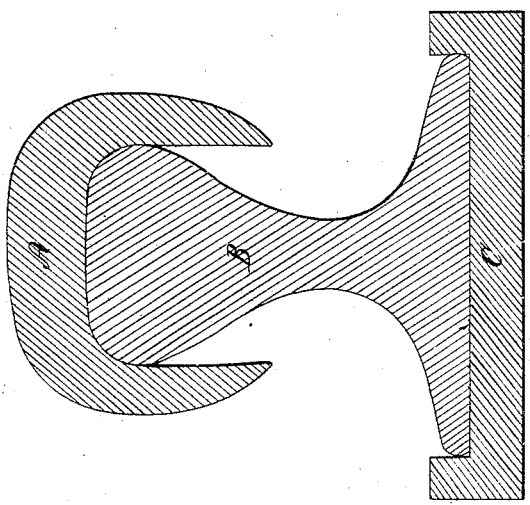
Witnesses:
J.B. Turchin
M. Doering
Inventor;
Octave Chanute

United States Patent Office.

OCTAVE CHANUTE, OF CHICAGO, ILLINOIS.

Letters Patent No. 61,397, dated January 22, 1867.

---

IMPROVEMENT IN REPAIRING RAILROAD RAILS.

---

*The Schedule referred to in these Letters Patent and making part of the same.*

---

TO ALL WHOM IT MAY CONCERN:

Be it known that I, OCTAVE CHANUTE, of the city of Chicago, in the county of Cook, and State of Illinois, have invented a new and improved Process for Repairing or Re-rolling Railroad Rails; and I do hereby declare that the following is a full and exact description thereof, reference being had to the accompanying drawings, making part of this specification, and to the letters of reference marked thereon.

The re-working or re-rolling of iron rails for railways, as at present practised, is a very expensive and unsatisfactory process. The worn bars are either first rolled down in slabs, or in their original shape cut up into lengths of three or four feet, and arranged in piles varying in their arrangement in different mills, but generally from six to eight inches square, from which a new rail is rolled. This process not only requires a large quantity of fuel to bring so large a mass up to a welding heat, and great power to compress and roll it down into a rail, but it wastes about fifteen per cent. of iron, and generally produces rails of inferior wearing quality to the original. The latter is attributed to the fact that wrought iron, upon being reworked, is deprived of a portion of its cinder, and that although it then becomes stronger, and more capable of resisting tensile strains, its welding properties are impaired. Old rails, moreover, are generally composed of different qualities of iron—granular in the head which welds easily, and tough and fibrous in the foot, which welds with difficulty. In the present methods of re-rolling, these different qualities are necessarily distributed through different parts of the pile, and do not weld well together, thus very soon producing lamination in the new rail and consequent destruction. My process differs from all methods at present used, and consists in heating each old rail separately by welding on a cap piece on the head, and if necessary a bottom piece on the foot, leaving the old rail of such sufficient length, say from twelve to twenty feet, as to re-roll, with the above additions, into a new rail of the length required.

To enable others skilled in the art to use my invention, I will proceed to describe the process and its operation.

Figure 1 represents the rail-pile invented by me and from which a new rail is to be rolled, in which B is the old rail, in suitable lengths, this being determined by the weight per yard of the old rail, the weight of the new rail it is designed to make, and the proportions of new metal added in the head and foot pieces. A is a new head-piece, composed of iron, steel, or other metal, of such quality as to weld most readily with the iron already rich in cinder in the head of the old rail. The exact thickness and shape to be given to this new head-piece will be determined by the form of the old rail, but its general shape is that of an inverted U. It is obvious, that instead of forming the head-plate in the form of the inverted U, as shown in fig. 1, and dropping it on from above as described, it may be formed more in the shape of a ring, as represented in fig. 2, and then be shoved on to the rail endwise. It is desirable in all cases that the piece added to the head of the rail should clasp around and under the head, so that if it should fail to weld perfectly at any point, it cannot become detached, it being firmly clamped to the head of the rail, in nearly the same manner that the foot of the rail is clamped by the chair, only more completely and firmly. C is a new foot, composed either of new iron, or other metal, or of old rails rolled down, which is introduced when required to give the necessary thickness or strength to the new rail, many old rails being brittle from long use, and requiring additional tensile strength in the base.

The method of working it is as follows: The pile above described, after being heated in a suitable furnace, is rolled into a new rail; the first passes are best made upon its foot, compressing and welding it into the shape indicated by Figure 2; it is then passed through the rolls upon its side so as to draw down the new head and wrap it around the old, and after making a suitable number of passes required by the form to be given to it, comes out a finished rail, as indicated by Figure 3, in which A represents the new head of iron or steel wrapped around the old, B the old rail, and C the new foot, which, however, may be left off when not required to give thickness or strength to the foot of the new rail.

Having thus described my process of re-rolling railroad rails, what I claim as my invention, and desire to secure by Letters Patent, is—

A pile for forming a railway bar, composed of an old or worn rail, and a new bar of iron or steel, for the head and foot, or either, substantially as herein shown and described.

OCTAVE CHANUTE.

Witnesses:
J. C. McMULLIN,
E. R. PRICE.